P. B. BOSWORTH.
FASTENING MEANS FOR VEHICLE TIRES.
APPLICATION FILED NOV. 5, 1906.
977,586.
Patented Dec. 6, 1910.
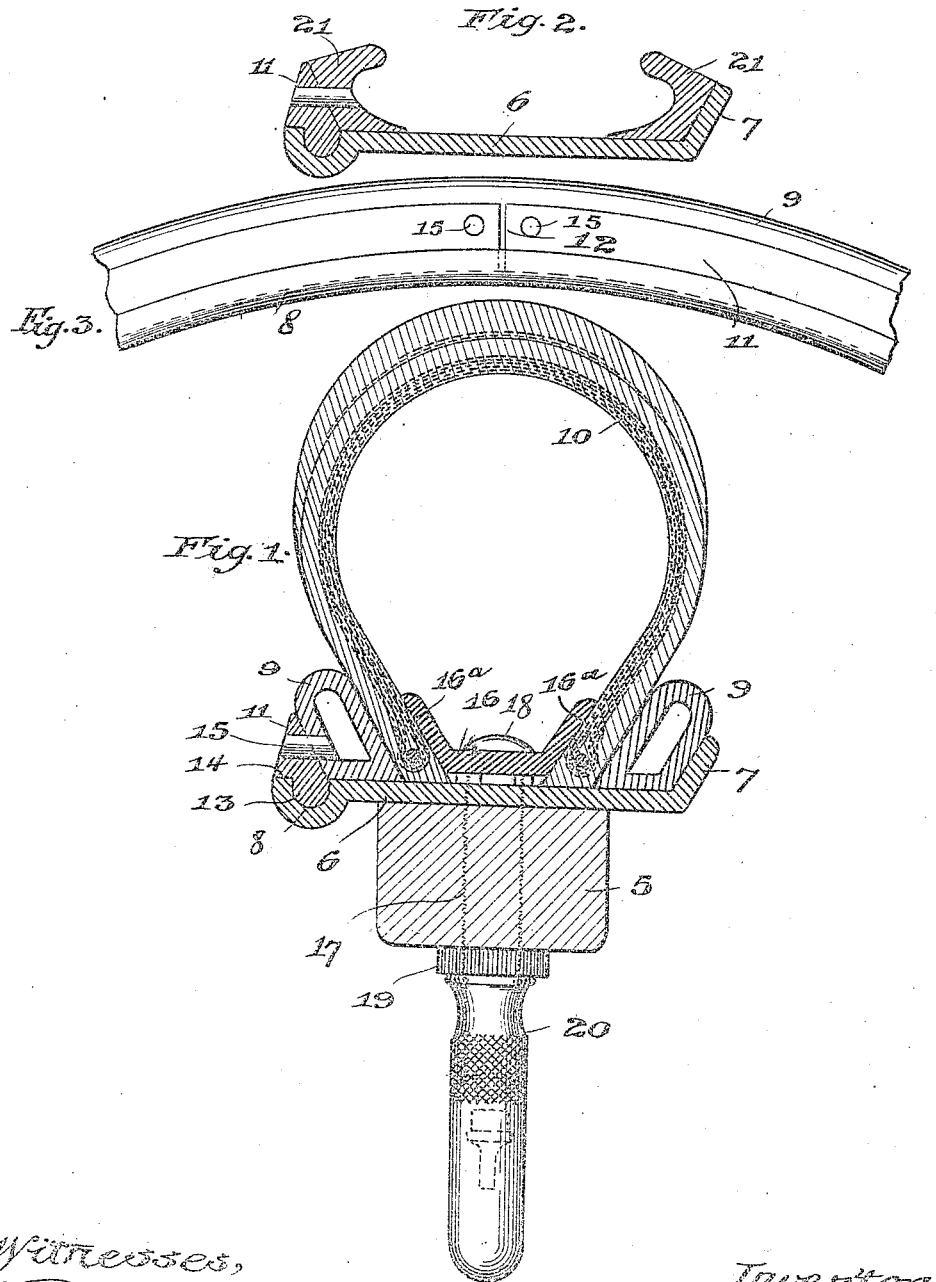

UNITED STATES PATENT OFFICE.

PERCY B. BOSWORTH, OF AKRON, OHIO, ASSIGNOR TO FIRESTONE TIRE & RUBBER COMPANY, OF AKRON, OHIO, A CORPORATION OF WEST VIRGINIA.

FASTENING MEANS FOR VEHICLE-TIRES.

977,586.

Specification of Letters Patent.  Patented Dec. 6, 1910.

Application filed November 5, 1906. Serial No. 342,110.

*To all whom it may concern:*

Be it known that I, PERCY B. BOSWORTH, a citizen of the United States, residing at Akron, in the county of Summit, in the State of Ohio, have invented certain new and useful Improvements in Fastening Means for Vehicle-Tires, of which the following is a specification.

This invention relates to means for fastening hollow rubber tires to vehicle wheels and more particularly to means for securing inflated tires to such rims in a detachable manner. These hollow inflatable tires are of various forms so far as relates to their method of attachment to the rim of the wheel, some of them being of the well-known clencher type wherein the outer sides of the inner margins or lips of the tire are grooved to receive engaging flanges on the wheel rim, or of a part connected therewith. Other tires have ungrooved margins, the outer sides of which are smooth and which are held by the inflation of the tire against lateral abutments afforded by flanges on the rim. The wheel rims and the tires are of standard widths but owing to the dissimilar provisions for fastening the tires to the rims which are employed no practicable means have heretofore been provided for easily adapting a fastening means to the two differently constructed tires.

It is the principal object of my invention to provide a fastening which is quickly adaptable to either form of rim, and to this end I employ in connection with a rim having an integral tire-retaining flange, a separable locking-ring and intermediate filler-rings affording abutments for the sides of a plain tire, or interlocking engagement with the grooves of a clencher type of tire.

The present invention may be said to constitute an improvement upon or extension of a device having in part the same principle constituting the subject-matter of an application filed by me on the 9th of June, 1906, Serial No. 320,984.

The invention consists of the matters hereinafter described and claimed, and will be readily understood when considered in connection with the accompanying drawings, wherein—

Figure 1 is a cross-sectional view through the tire, rim and felly; Fig. 2 is a similar view through the rim, showing a modified form of side-rings of the clencher type; and Fig. 3 is a side elevational view of a section of the rim showing the side-ring and the locking-ring applied thereto.

Referring to the drawings, 5 may designate the usual felly, and 6 the base member of a channel rim, which base member is shown in Figs. 1 and 2 as formed with one integral or permanent side flange 7, and as formed on its other side with a groove 8, herein shown as of semi-circular cross-section.

9 (Fig. 1) designates each of a pair of tubular side or filler-rings of outwardly flaring form in cross-section, which rings seat on the rim 6 and on their inner surfaces directly engage the inner or base portion of a split tire, the latter being designated as an entirety by 10, and having smooth outer side walls adapted to snugly fit the inner sides of the filler-rings 9. One of these rings lies against the integral flange 7, being confined between the latter and the adjacent side wall of the tire body; while the other ring is confined and locked against lateral displacement by a removable side-flange 11 which I term a locking-ring. This latter, as shown in Fig. 3, is split or broken at a point in its circumference, indicated at 12, to enable it to be readily expanded and sprung over the edge of the rim 6, and has on its inner or under side a bead 13 adapted to seat snugly in the groove 8 of the rim. On the outer side of the bead 13, the locking-ring is provided with a laterally projecting square ledge or shoulder 14 that abuts against the upper edge of the curved margin of the rim 6 forming the groove or seat 8, so as to prevent over-turning or upsetting of the locking-ring under lateral strains. The side and locking-rings are preferably interlocked by means of two or more pins 15 passed through the locking-ring and the adjacent side wall of the side-ring, which pins may be fast with either ring and inserted into registering holes in the other; the pins, in the preferred arrangement, being fast with the side-ring 9 and entering registering holes in the locking-ring 11.

16 designates a wedge-shaped spreader located internally of the tire body and having side walls or wings 16ª that engage the inner sides of the walls of the tire, the spreader being drawn inwardly toward the rim 6 by means of a threaded shank 17 having a head 18 engaging the upper side of the spreader and a clamping nut 19 on the inner or under side of the felly. Preferably the shank of the spreader is made integral with and constitutes the stem of the usual inflating valve, the same being herein shown as covered and protected by the usual tubular dust-cap 20. The spreader 16 has the function not only of spreading the side walls of the tire and clamping them hard against the side-rings 9 but it also grips the tire securely to the rim and prevents creeping.

In Fig. 2 I have shown, in lieu of the flat-surfaced side-rings 9 of Fig. 1, interchangeable side-rings of clencher form, designated by 21; this latter type of side-ring being equally applicable for use in connection with the locking-ring 11, as plainly shown; the entire construction producing a rim of the clencher type with the described advantages of easy and quick detachability and application of the tire when desired.

From the foregoing it will be seen that my invention provides a simple and easily manipulated fastening means for tires, which renders the latter easily and readily detachable, and which is quickly interchangeable to accommodate either the grooved or plain-surfaced form of tires by simply interchanging the side or filler-rings 9 and 21. It will be evident that the principle of the invention can readily be extended to still other forms of filler-rings than those herein shown adapted for engagement and coöperation with still other forms or types of tires; it being understood that the rim and the locking means are adapted to accommodate interchangeably any forms of side or filler-rings that may be necessary for use with the particular type or construction of tire employed in any particular instance.

I claim—

The combination with a rim having an annular groove in one edge portion thereof, and a filler-ring mounted on said rim, of a circumferentially expansible and contractible locking-ring engaging the outer side of said filler-ring throughout substantially the full width of the latter, said locking-ring having a bead seated in said groove and a square annular shoulder resting against the portion of said rim outside of said groove, and pins connecting said locking-ring and filler-ring, substantially as described.

PERCY B. BOSWORTH.

Witnesses:
SAMUEL N. POND,
FREDERICK C. GOODWIN.